Dec. 15, 1970 A. R. RODRIGUEZ ET AL 3,546,776

PROCESS FOR MANUFACTURING A CERAMIC MULTILAYER CIRCUIT MODULE

Filed Jan. 6, 1966

INVENTORS
ANTONIO R. RODRIGUEZ
JOHN CRONIN

BY [signature]

ATTORNEY

United States Patent Office 3,546,776

Patented Dec. 15, 1970

3,546,776

PROCESS FOR MANUFACTURING A CERAMIC MULTILAYER CIRCUIT MODULE

Antonio R. Rodriguez, Franklinville, and John Cronin, Bolivar, N.Y., assignors to Aerovox Corporation, New Bedford, Mass., a corporation of Massachusetts Continuation-in-part of application Ser. No. 221,885, Sept. 6, 1962. This application Jan. 6, 1966, Ser. No. 519,094

Int. Cl. H05k 3/30

U.S. Cl. 29—626 6 Claims

ABSTRACT OF THE DISCLOSURE

This invention relates to the art of multilayer circuit modules and more particularly to a module of ceramic material formed from a plurality of superimposed sheets of such ceramic material, each sheet having a metallized coating on at least one face with the sheets being retained in intimate contact by being subjected to pressure while lateral displacement thereof is restrained.

This application is a continuation-in-part of copending application Ser. No. 221,885, filed Sept. 6, 1932, now U.S. Pat. No. 3,235,939, issued Feb. 22, 1966. Reissued as Pat. No. Re. 26,421, dated July 2, 1968.

As conducive to an understanding of the invention, it is noted that where a multilayer circuit module is formed from a plurality of superimposed sheets of plastic material, each of which has a particular circuit configuration deposited thereon, which sheets are then bonded together by a suitable plastic cement, although the resultant module may have the compactness and rigidity required for modern applications, due to the inherent temperature limitations of plastics, such modules have extreme limitations in use.

More particularly, where the module is used in conjunction with electrical components such as resistors or capacitors capable of withstanding high temperatures and such module is used in space vehicles or the like where they are subjected to extremely high temperatures, due to the inherent limitations of the plastic, the latter will tend to degrade, causing malfunctioning of the electrical circuit. Furthermore, since plastics are of organic material, the radiation present in many uses to which the module may be put, will cause degradation of the plastic and malfunctioning of the system.

In addition, where the module is used in an atmosphere containing high humidity, since the plastic has a certain degree of permeability, the moisture would be absorbed with resultant malfunctioning of the electrical circuit.

It is accordingly among the objects of the invention to provide a process for manufacturing a multilayer circuit module which will be capable of operation without degradation of the material from which the module is formed, even at extremely elevated temperatures and in the presence of a high degree of radiation and which is impervious to moisture.

According to the invention, these objects are accomplished by the arrangement and combination of elements hereinafter described and more particularly recited in the claims.

Figure 1:
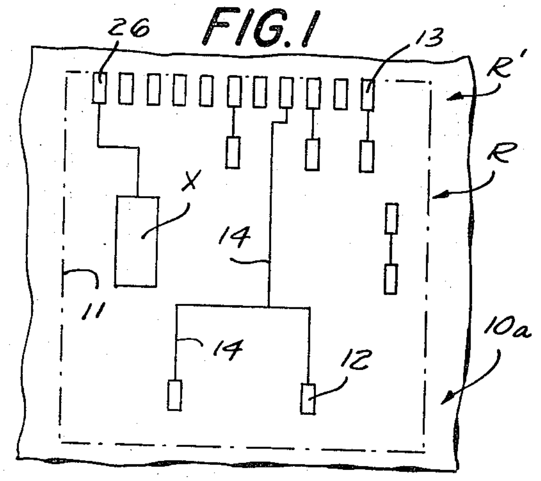
Figure 2:
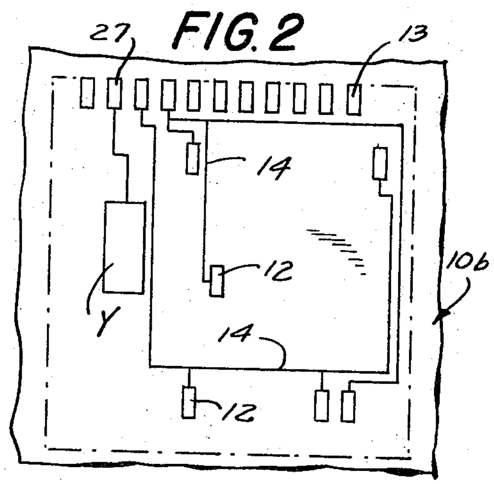
Figure 3:
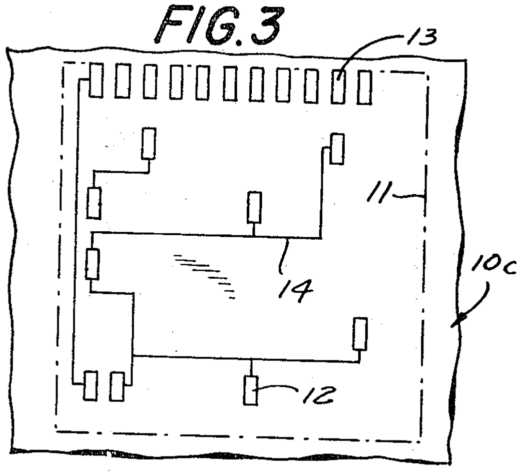
Figure 4:
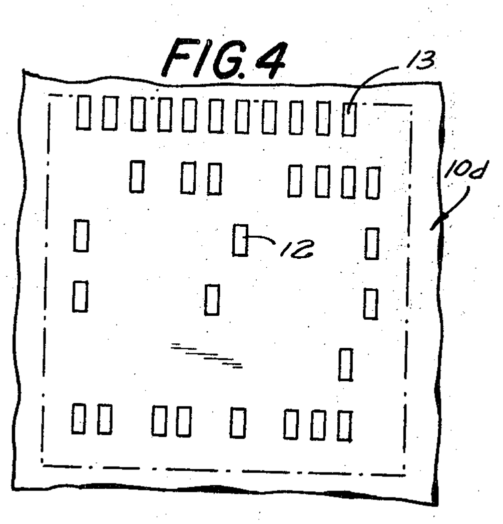
Figure 6:
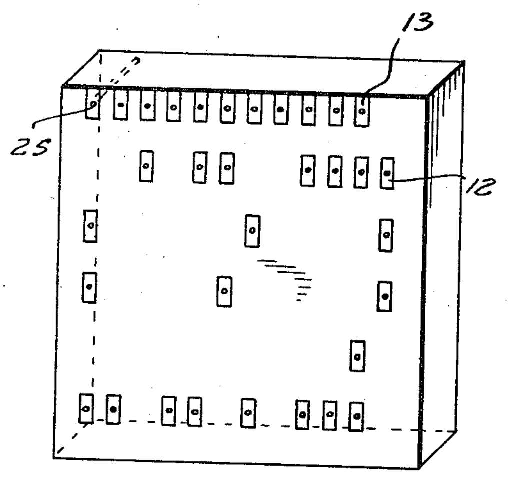
Figure 5:
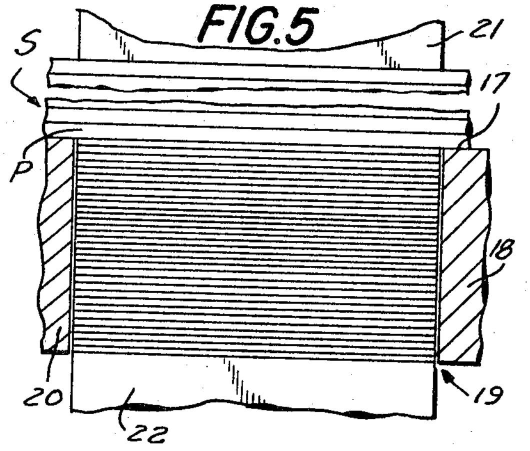

In the accompanying drawings in which is shown one of various possible embodiments of modules formed by the process hereof;

FIGS. 1 to 3 are diagrammatic plan views of ceramic sheets metallized with contacts, terminals and circuit wiring, FIG. 4 is a view similar to FIGS. 1 to 3 but of the top panel to which the circuit wiring on the other panels is interconnected, FIG. 5 is a transverse sectional view of a press for forming the module, and FIG. 6 is a perspective view of the module ready for attachment of circuit elements thereto.

As shown in the drawings, the module is formed from a plurality of stacked sheets or plates 10 of ceramic material.

The process of forming the sheets from a ceramic mix is described in Pat. No. 3,004,197 of Antonio R. Rodriguez and Arthur B. Wallace.

The process may be summarized as follows:

The ceramic mix from which the sheets are made contains the ceramic powder, for example, a mixture of titanates, zircontates, stannates of the alkali earth metals, such as calcium barium and strontium as well as titanium dioxide.

It is also desirable to use ceramic materials of low dielectric constant as alumina, steatite and other silicates for pure wiring applications. These materials are slurried, for example, in an aqueous liquid in which composition it is mixed with binders such as polyvinyl alcohol and deflocculants, such as lignates or alginates.

The slip is freed of bubbles by deairing as by subjecting it to a vacuum before casting and formation into a sheet.

The deairing may be accomplished in a dispersion machine under a vacuum of 28″ while the material is a slurry before casting into layers, while at the same time breaking up all agglomerates.

The slurry is then cast on a smooth impervious surface and is left to dehydrate or is dried in an oven to form a coherent flexible sheet which may be handled and punched, with the binder holding the particles together.

The sheets when formed will carry about 8 to 15% of polymer binder which is usually polyvinyl alcohol. The sheets may be from 5 mils or less in thickness after firing.

Each of the sheets on one surface thereof has deposited thereon as shown in FIG. 1, a metallized pattern 11 defined within the region illustrated by the broken lines. The pattern may comprise a plurality of contact tabs 12 and one or more terminal tabs 13, along an edge of the pattern region. In addition, the pattern includes a wiring configuration 14 which is connected to the contact tabs 12 and to a terminal tab 13.

To further minimize the completed assembly size, it will frequently be desirable to include capacitor electrodes as part of the metallized pattern, thus building a multi-layer capacitor or capacitors into a portion of the wiring block, making the attachment of an external capacitor or capacitors of that value unnecessary, thereby saving space and cost, and increasing reliability due to fewer external component connections. The electrode X is connected to what will become terminal tab 26. The alternate electrode Y is connected to terminal tab 27 and when the plates shown in FIG. 1 and FIG. 2 are stacked in alternate layers, will form, with electrode X a multilayer capacitor. The capacitor may be terminated anywhere on the board as desired, or connected to the external tabs or internal wiring.

It is within the scope of the invention to have on each of the sheets a metallized pattern forming a plurality of rows R of contact tabs 12 and a single row R′ of terminal tabs 13 with each row having a sufficient plurality of spaced terminal tabs and contact tabs to cover the width of the pattern region, or each sheet may have only that number of contact tabs 12 and terminal tabs 13 necessary for the particular wiring configuration carried by said sheet.

In the illustrative embodiment herein shown, each sheet 10 is formed with the same metallized pattern 11 repeated at spaced intervals. However, it is also within the scope of the invention to have each metallized pattern 11 formed on a separate ceramic plate or to have each sheet formed with the different patterns 11 illustratively shown in FIGS. 1 to 3, repeated thereon.

The topmost sheet 10*d* on which the resistors or capacitors, or other electrical components are mounted, would however, have sufficient contact tabs and terminal tabs so that electrical connection could be made through each of the tabs on the topmost sheet with each of the tabs on the intervening sheets to which wiring is connected in the manner hereinafter to be described.

The tabs and capacitor electrodes in the embodiment herein shown are desirably formed by metallizing the surface, for example, by screening or spraying from a suspension of palladium or platinum, silver or the like which can withstand the firing temperature of the ceramic in the manner hereinafter described without melting or oxidizing.

The palladium, platinum or silver is finely dispersed in a fineness of 1 to 10 microns in an organic solvent having a high boiling point such as butyl cellosolve or carbitol acetate in the presence of an organic binder.

After application of the metal on the sheet, it is dried in an oven at about a temperature of about 60 to 100° C.

In an illustrative embodiment of the invention where each green sheet has the identical pattern thereon, a plurality of the sheets are arranged in a stack so that the patterns 11 of one sheet are vertically aligned with the different patterns 11 on the other sheets. Thus, there will be aligned a plurality of patterns 11 which are required for a given module.

Thereupon, the stack of sheets S is placed on the top surface 17 of the body portion 18 of a die 19, the latter having a bore 20 therethrough. Associated with the bore 20 is an upper punch 21 and a lower punch 22. The bore 20 is illustratively square in cross section as are the punches 21, 22, and the dimension of the upper punch 21, for example, is equal to the desired size of the plate P to be punched from each of the ceramic sheets and more particularly is of dimensions corresponding to the broken lines defining the pattern region 11.

Thereupon, the upper punch 21 is forced downwardly in conventional manner to cut a plurality of plates from the stack of sheets.

The punch 21 is moved relatively slowly into the bore 20 and pressure is exerted in the order of from 10 to 30 tons per square inch upon the stack of plates now positioned in the bore 20, the wall of the bore restraining lateral displacement of the stack.

Although, as above described, a plurality of sheets are punched simultaneously to form the plates of the stack, it is understood that the plates may be formed separately and positioned in a die cavity to form a stack, or plates may be punched directly into the die cavity from individual sheets.

In any event, the final stack is pressed together as above described so that the plates are substantially integrated and the resultant block or module is then removed from the cavity 20.

A hole 25 is drilled through each of the contact tabs 12 and terminal tabs 13 on the top surface of the block or module thus formed, as shown in FIG. 6, said holes extending through the module so that they pass through all of the tabs therebeneath.

At this time, the holes thus provided in the module have their wall surfaces coated with a conductive material of the same type as is used to form the tabs and wiring. such coating thereby electrically connecting the internal circuitry to the associated tabs on the top surface of the module.

The module is then fired at a temperature which depends upon the nature of the ceramic and metal used.

For example, where palladium is used, the firing temperature can be in the order of 2,100 to 2,600° F. This will cause the ceramic to harden into a non-porous, rigid module.

Thereupon, the module is ready for the attachment of the electrical components which are bonded in conventional manner to the appropriate tabs on the top surface of the module.

With the process above described, a multilayer circuit module is provided which is of great physical strength and ruggedness and is capable of withstanding elevated temperatures, and by reason of the high density obtained by the applied pressure and the subsequent firing of the ceramic will have substantially no porosity and hence will be substantially unaffected by humidity, thereby assuring high reliability.

As many changes could be made in the above process and many apparently widely different embodiments of this invention could be made without departing from the scope of the claims, it is intended that all matter contained in the above description or shown in the accompanying drawings shall be interpreted as illustrative and not in a limiting sense.

Having thus described our invention, what we claim as new and desire to secure by Letters Patent of the United States is:

1. A process of forming a ceramic multilayer circuit module which comprises first forming and drying thin coherent flexible green ceramic sheets containing a plastic binder, by casting from a slip devoid of air bubbles, depositing on one face of each sheet a refractory metal which does not oxidize or melt at the firing temperature of the ceramic material to form one or more contact tabs and terminal tabs on each face, and also depositing a refractory metal on at least one face of each sheet to define a particular wiring arrangement between at least one of said contact tabs and at least one of said terminal tabs, forming a stack of such sheets together with an additional sheet which also forms part of the stack and which is positioned on the top thereof and which has solely contact tabs and terminal tabs aligned with the corresponding tabs on the other sheets of the stack, providing intimate contact between all the sheets by subjecting the stack to pressure while confining lateral displacement of such stack to form a module of relatively high density, drilling holes through the tabs and the ceramic sheets in the module thus formed to provide paths through the module to all of the tabs connected by the wiring arrangement, metallizing the interior of such holes to provide electrical connections between the tabs and thereupon firing the module to mature the ceramic material, whereby the resultant module will have substantially no porosity and be substantially unaffected by humidity and have a high dielectric constant.

2. The process set forth in claim 1 in which each of the sheets has a metallized pattern thereon defining said contact tabs, terminal tabs and wiring arrangement, said pattern being repeated on each sheet, a plurality of said sheets, each carrying a particular pattern, are superimposed to form such stack, and the stack is thereupon punched to form a plurality of plates each having one of the associated patterns thereon.

3. The process set forth in claim 1 in which the module is fired at a temperature of between 2100 to 2600° F.

4. The process set forth in claim 1 in which the interior of the holes punched through the tabs is metallized with the same materials as is used in forming the tabs and wiring arrangement.

5. The process set forth in claim 1 in which circuit elements are connected between contact tabs and terminal tabs exposed on the top sheet of the stack.

6. The process set forth in claim 1 in which an additional layer of refractory metal is deposited on said one face of at least two sheets so that when the stack is formed such two layers will be aligned to define capacitor plates with the ceramic material of the sheet intervening to form a dielectric, and refractory metal is deposited on each of such sheets to connect each of said layers to an associated terminal tab.

References Cited

UNITED STATES PATENTS

| | | | |
|---|---|---|---|
| 2,389,420 | 10/1945 | Degrup | 75—208 |
| 2,395,442 | 2/1946 | Ballard | 75—208X |
| 3,021,589 | 2/1962 | Weller | 29—25.42 |
| 3,102,213 | 8/1963 | Bedson et al. | 174—68.5 |
| 3,184,661 | 5/1965 | Weller | 317—261 |
| 3,189,978 | 6/1965 | Stetson | 29—625 |
| 3,195,027 | 7/1965 | Vandermark et al. | 317—242 |
| 3,079,672 | 3/1963 | Bain et al. | 29—625 |
| 3,143,787 | 8/1964 | Babbe | 29—625 |
| 3,235,939 | 2/1966 | Rodriguez et al. | 317—258 |
| 3,344,515 | 10/1967 | Schuster et al. | 29—628 |

JOHN E. CAMPBELL, Primary Examiner

R. W. CHURCH, Assistant Examiner

U.S. Cl. X.R.

29—25.42